US012567183B2

(12) United States Patent
Partin et al.

(10) Patent No.: US 12,567,183 B2
(45) Date of Patent: Mar. 3, 2026

(54) METHODS AND APPARATUS FOR MEDICAL IMAGE RECONSTRUCTION USING MACHINE LEARNING BASED PROCESSES

(71) Applicant: Siemens Medical Solutions USA, Inc., Malvern, PA (US)

(72) Inventors: Lauren Partin, Knoxville, TN (US); Vijay Shah, Knoxville, TN (US); Sven Zuehlsdorff, Oak Brook, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 310 days.

(21) Appl. No.: 18/423,780

(22) Filed: Jan. 26, 2024

(65) Prior Publication Data

US 2025/0245864 A1    Jul. 31, 2025

(51) Int. Cl.
| | |
|---|---|
| *G06T 11/00* | (2026.01) |
| *G06T 7/11* | (2017.01) |
| *G06T 7/30* | (2017.01) |
| *G06T 7/73* | (2017.01) |
| *G06T 9/00* | (2006.01) |
| *G06V 10/44* | (2022.01) |

(52) U.S. Cl.
CPC .............. *G06T 11/00* (2013.01); *G06T 7/11* (2017.01); *G06T 7/30* (2017.01); *G06T 7/73* (2017.01); *G06T 9/00* (2013.01); *G06V 10/44* (2022.01); *G06T 2207/10104* (2013.01); *G06T 2207/10108* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 10,967,202 B2 | 4/2021 | Van Heteren et al. | |
| 11,337,668 B2 | 5/2022 | Yu et al. | |
| 2021/0335480 A1* | 10/2021 | Johnsson | G06N 3/045 |
| 2022/0296194 A1 | 9/2022 | Bal et al. | |

(Continued)

OTHER PUBLICATIONS

Sizikova, Elena et al., "Improving Computed Tomography (CT) Reconstruction via 3D Shape Induction", Machine Learning for Health (ML4H), Aug. 2022, 11pgs., 10.48550/arXiv.2208.10937.

(Continued)

*Primary Examiner* — Beniyam Menberu

(57) ABSTRACT

Machine learning based systems and methods for improving attenuation and scatter correction and for estimating organ volume in medical images are disclosed. In some embodiments, a co-modality image, a non-attenuated corrected nuclear image, and an x-ray image are received. A first machine learning process is applied to the co-modality image to generate location data identifying feature locations. Further, a second machine learning process is applied to the non-attenuated corrected nuclear image, the x-ray image, and the location data to generate a segmentation mask. In addition, at least a third machine learning process is applied to the segmentation mask, the co-modality image, the non-attenuated corrected nuclear image, and the x-ray image to generate a plurality of synthetic images. Moreover, at least a fourth machine learning process is applied to the plurality of synthetic images to generate a final synthetic image.

20 Claims, 10 Drawing Sheets

(56) References Cited

U.S. PATENT DOCUMENTS

2023/0410985 A1* 12/2023 Brynolfsson ............. G06T 7/30
2024/0428567 A1* 12/2024 Annangi ................ G06V 10/82
2025/0014382 A1* 1/2025 Hong ................... A61B 6/5217

OTHER PUBLICATIONS

Henzler, Phlipp et al., "Single-image Tomography: 3D Volumes from 2D Cranial X-Rays", Computer Graphics Forum, vol. 37, Issue 2, May 2018, 377-388pgs., https://doi.org/10.1111/cgf.13369.
Balashova, Elena et al., "3D Organ Shape Reconstruction from Topogram Images", Information Processing in Medical Imaging, Mar. 29, 2019, 12pgs., 10.1007/978-3-030-20351-1_26.
Shapira, Nadav et al., "Convolutional Encoder-Decoder Networks for Volumetric Computed Tomography Surviews from Single- and Dual-View Topograms", medRxiv, May 21, 2022, 19pgs., https://doi.org/10.1101/2022.05.17.22275229.

* cited by examiner

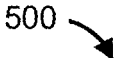
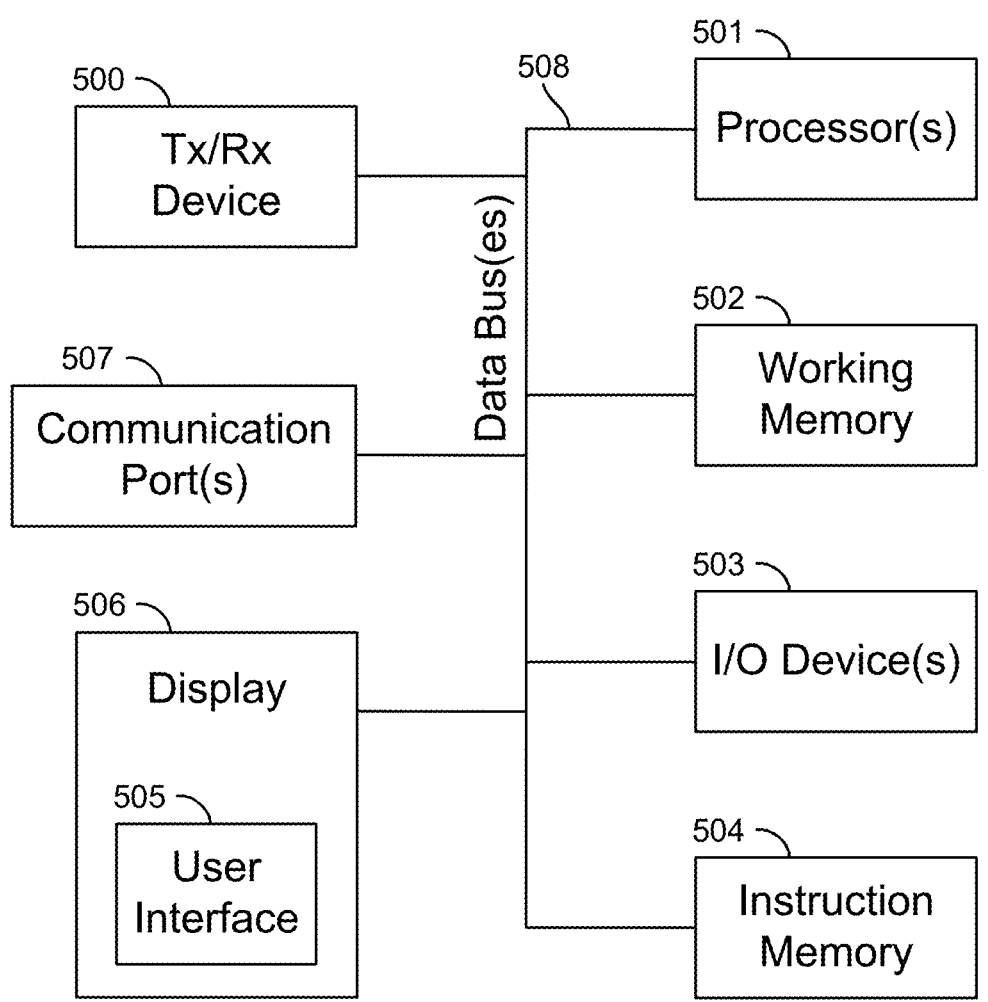
FIG. 5

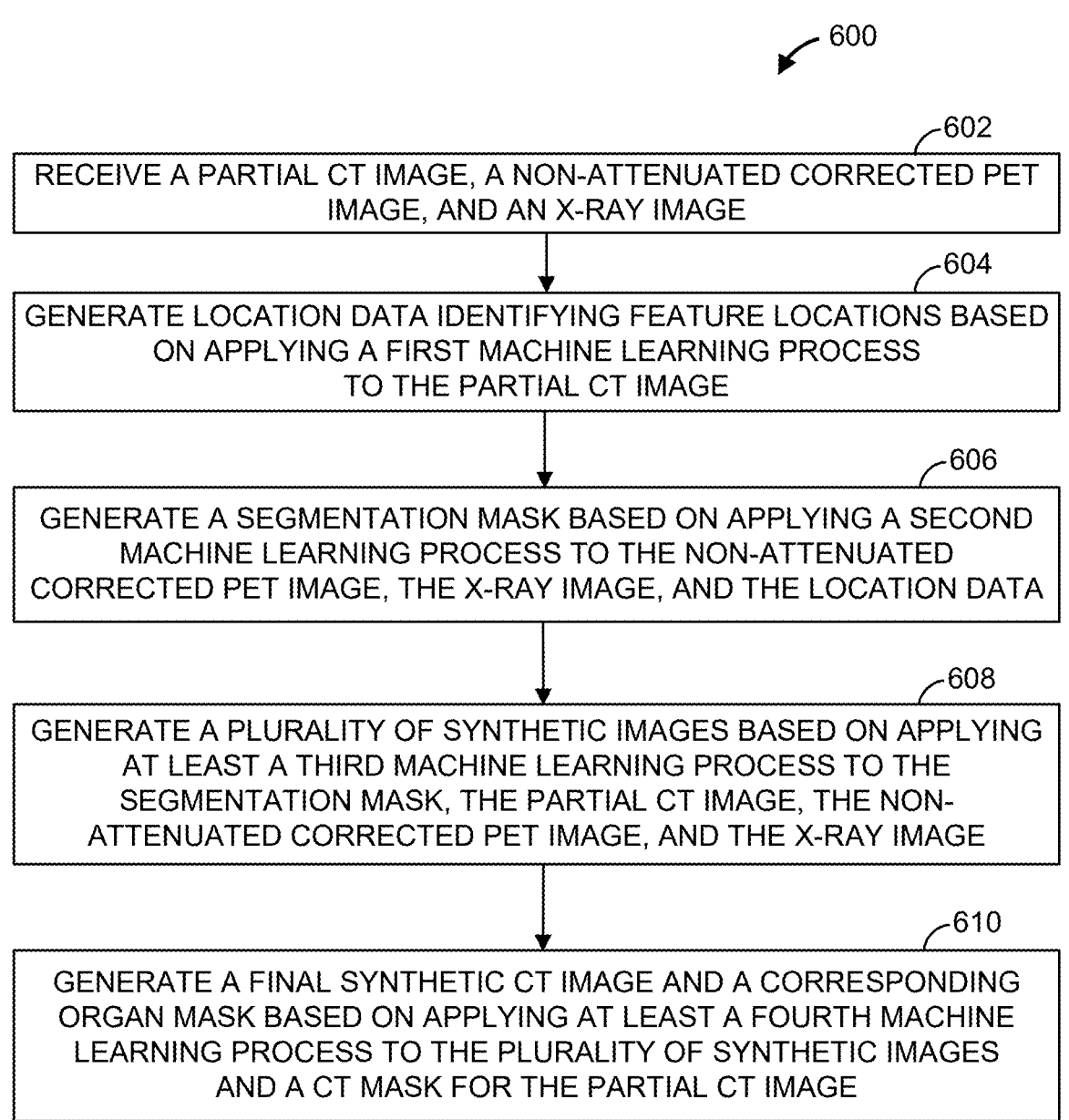

600

602
RECEIVE A PARTIAL CT IMAGE, A NON-ATTENUATED CORRECTED PET IMAGE, AND AN X-RAY IMAGE

604
GENERATE LOCATION DATA IDENTIFYING FEATURE LOCATIONS BASED ON APPLYING A FIRST MACHINE LEARNING PROCESS TO THE PARTIAL CT IMAGE

606
GENERATE A SEGMENTATION MASK BASED ON APPLYING A SECOND MACHINE LEARNING PROCESS TO THE NON-ATTENUATED CORRECTED PET IMAGE, THE X-RAY IMAGE, AND THE LOCATION DATA

608
GENERATE A PLURALITY OF SYNTHETIC IMAGES BASED ON APPLYING AT LEAST A THIRD MACHINE LEARNING PROCESS TO THE SEGMENTATION MASK, THE PARTIAL CT IMAGE, THE NON-ATTENUATED CORRECTED PET IMAGE, AND THE X-RAY IMAGE

610
GENERATE A FINAL SYNTHETIC CT IMAGE AND A CORRESPONDING ORGAN MASK BASED ON APPLYING AT LEAST A FOURTH MACHINE LEARNING PROCESS TO THE PLURALITY OF SYNTHETIC IMAGES AND A CT MASK FOR THE PARTIAL CT IMAGE

FIG. 6

METHODS AND APPARATUS FOR MEDICAL IMAGE RECONSTRUCTION USING MACHINE LEARNING BASED PROCESSES

FIELD

Aspects of the present disclosure relate in general to medical diagnostic systems and, more particularly, to reconstructing images from nuclear imaging systems for diagnostic and reporting purposes.

BACKGROUND

Nuclear imaging systems can employ various technologies to capture images. For example, some nuclear imaging systems employ positron emission tomography (PET) to capture images. PET is a nuclear medicine imaging technique that produces nuclear images representing the distribution of positron emitting isotopes within a body. As another example, some nuclear imaging systems capture images using single-photon emission computed tomography (SPECT). SPECT produces a 3-dimensional image of a distribution of a radioactive tracer that is injected into a person's bloodstream and subsequently absorbed by certain tissue. Some nuclear imaging systems employ computed tomography (CT), for example, as a co-modality. CT is an imaging technique that uses x-rays to produce anatomical images. Magnetic Resonance Imaging (MRI) is another imaging technique that uses magnetic fields and radio waves to generate anatomical and functional images. Some nuclear imaging systems combine images from PET or SPECT and CT scanners during an image fusion process to produce images that show information from both a PET or SPECT scan and a CT scan (e.g., PET/CT systems, SPECT CT). Similarly, some nuclear imaging systems combine images from PET or SPECT and MRI scanners to produce images that show information from both a PET or SPECT scan and an MRI scan.

Typically, these nuclear imaging systems capture measurement data, and process the captured measurement data using mathematical algorithms to reconstruct medical images. The measurement data often requires correction for a number of photons that have either been lost for a sinogram bin (i.e., attenuation correction) or wrongly assigned to another sinogram bin (i.e., scatter correction). In some instances, the systems generate attenuation maps for attenuation and scatter correction. For example, the systems may generate the attenuation maps based on a CT image using a mapping algorithm. The systems may then generate a final reconstructed medical image based on the captured measurement data and the attenuation map. These attenuation corrections processes, however, can suffer from drawbacks.

For example, to accurately correct a non-attenuated corrected (NAC) PET image for attenuation, an attenuation map that covers all possible lines of response (LORs) is required. An attenuation map generated for a CT image, however, may cover only a subset of LORs at least because the CT image was scanned with a limited field-of-view (FOV). For instance, a patient may have been scanned over a specific area to generate the CT image, as opposed to generating a CT image covering the entire patient (e.g., head to toe). As such, the attenuation map may not accurately correct the NAC PET, which may cover the entire patient.

In addition, these limited FOV CT images may not allow for, or may reduce the accuracy of, various medical metrics, such as those based on organ volume. For instance, a CT image that omits part of an organ may not allow for the accurate computation of organ contribution percentage, and may limit a comparison of the computed contribution percentage with those computed for other scans (e.g., follow-up or population scans). As such, there are opportunities to address these and other deficiencies with attenuation correction processes in nuclear imaging systems.

SUMMARY

Systems and methods for correcting non-attenuated corrected (NAC) images, such as NAC PET images, based on co-modality images, such as computed tomography (CT) images, are disclosed. The systems and methods employ machine learning based processes that process co-modality images with limited field-of-views to generate a final synthetic image with a broader field-of-view (FOV) (e.g., a full view of a subject), and can also generate a corresponding attenuation map. The generated attenuation map can be used to correct the NAC image. For instance, one or more machine learning processes may be applied to a partial CT image (e.g., a CT image that captures a portion of a patient) to extend the partial CT image to a "full" CT image that covers a full patient (e.g., covers the patient head to toe). Moreover, the full CT image can be used to compute medical metrics for various organs (e.g., tissue, bones, etc.). For example, a percentage contribution for an organ can be defined as the metabolic tumor volume divided by the volume of a corresponding organ. Because the full CT image includes the entire organ, (e.g., the full CT image does not omit any part of the organ), the percentage contribution for the organ can be accurately computed based on the full CT image. For example, a skeletal tumor burden can be calculated relative to the skeletal regions of a patient, which may be fully captured within the full CT image.

In some embodiments, a computer-implemented method includes receiving a co-modality image, a non-attenuated corrected nuclear image, and an x-ray image. The method also includes applying a first machine learning process to the co-modality image and, based on the application of the first machine learning process, generating location data identifying feature locations. Further, the method includes applying a second machine learning process to the non-attenuated corrected nuclear image, the x-ray image, and the location data and, based on the application of the second machine learning process, generating a segmentation mask. The method also includes applying at least a third machine learning process to the segmentation mask, the partial co-modality image, the non-attenuated corrected nuclear image, and the x-ray image, and based on the application of the third machine learning process, generating a plurality of synthetic images. The method further includes applying at least a fourth machine learning process to the plurality of synthetic images and, based on the application of the at least fourth machine learning process, generating a final synthetic image.

In some embodiments, a non-transitory computer readable medium stores instructions that, when executed by at least one processor, cause the at least one processor to perform operations including receiving a co-modality image, a non-attenuated corrected nuclear image, and an x-ray image. The operations also include applying a first machine learning process to the co-modality image and, based on the application of the first machine learning process, generating location data identifying feature locations. Further, the operations include applying a second machine learning process to the non-attenuated corrected nuclear image, the x-ray image, and the location data and, based on the application of the second machine learning process, generating a segmentation mask. The operations also include applying at least a third machine learning process to the segmentation mask, the partial co-modality image, the non-attenuated corrected nuclear image, and the x-ray image, and based on the application of the third machine learning process, generating a plurality of synthetic images. The operations further include applying at least a fourth machine learning process to the plurality of synthetic images and, based on the application of the at least fourth machine learning process, generating a final synthetic image.

In some embodiments, a system includes a memory device storing instructions and at least one processor communicatively coupled the memory device. The at least one processor is configured to execute the instructions to perform operations including receiving a co-modality image, a non-attenuated corrected nuclear image, and an x-ray image. The operations also include applying a first machine learning process to the co-modality image and, based on the application of the first machine learning process, generating location data identifying feature locations. Further, the operations include applying a second machine learning process to the non-attenuated corrected nuclear image, the x-ray image, and the location data and, based on the application of the second machine learning process, generating a segmentation mask. The operations also include applying at least a third machine learning process to the segmentation mask, the partial co-modality image, the non-attenuated corrected nuclear image, and the x-ray image, and based on the application of the third machine learning process, generating a plurality of synthetic images. The operations further include applying at least a fourth machine learning process to the plurality of synthetic images and, based on the application of the at least fourth machine learning process, generating a final synthetic image.

In some embodiments, an apparatus includes a means for receiving a co-modality image, a non-attenuated corrected nuclear image, and an x-ray image. The apparatus also includes a means for applying a first machine learning process to the co-modality image and, based on the application of the first machine learning process, generating location data identifying feature locations. Further, the apparatus includes a means for applying a second machine learning process to the non-attenuated corrected nuclear image, the x-ray image, and the location data and, based on the application of the second machine learning process, generating a segmentation mask. The apparatus also includes a means for applying at least a third machine learning process to the segmentation mask, the partial co-modality image, the non-attenuated corrected nuclear image, and the x-ray image, and based on the application of the third machine learning process, generating a plurality of synthetic images. The apparatus further includes a means for applying at least a fourth machine learning process to the plurality of synthetic images and, based on the application of the at least fourth machine learning process, generating a final synthetic image.

BRIEF DESCRIPTION OF THE DRAWINGS

The following will be apparent from elements of the figures, which are provided for illustrative purposes and are not necessarily drawn to scale.

FIG. 5 illustrates a block diagram of an example computing device that can perform one or more of the functions described herein, in accordance with some embodiments.

FIG. 6 is a flowchart of an example method to reconstruct an image, in accordance with some embodiments.

DETAILED DESCRIPTION

Figure 1:
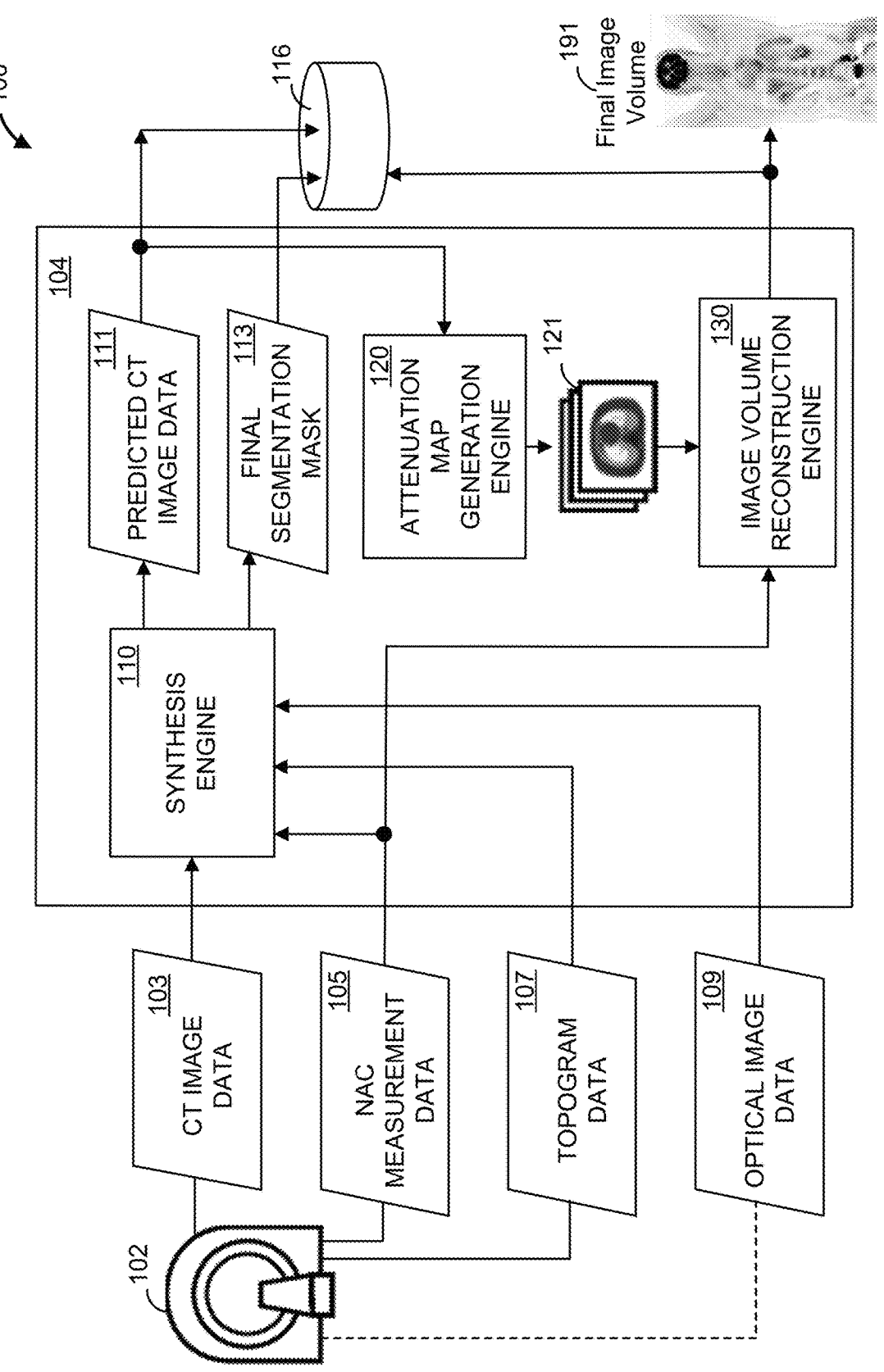
FIG. 1 illustrates an example of a nuclear image reconstruction system, in accordance with some embodiments.

This description of the exemplary embodiments is intended to be read in connection with the accompanying drawings, which are to be considered part of the entire written description. Independent of the grammatical term usage, individuals with male, female, or other gender identities are included within the term.

The exemplary embodiments are described with respect to the claimed systems as well as with respect to the claimed methods. Furthermore, the exemplary embodiments are described with respect to methods and systems for image reconstruction, as well as with respect to methods and systems for training functions used for image reconstruction. Features, advantages, or alternative embodiments herein can be assigned to the other claimed objects and vice versa. For example, claims for the providing systems can be improved with features described or claimed in the context of the methods, and vice versa. In addition, the functional features of described or claimed methods are embodied by objective units of a providing system. Similarly, claims for methods and systems for training image reconstruction functions can be improved with features described or claimed in context of the methods and systems for image reconstruction, and vice versa.

Various embodiments of the present disclosure can employ machine learning methods or processes to provide clinical information from nuclear imaging systems. For example, the embodiments can employ machine learning methods or processes to reconstruct images based on captured measurement data, and provide the reconstructed images for clinical diagnosis. In some embodiments, machine learning methods or processes are trained, to improve the reconstruction of images.

Various embodiments of the present disclosure can employ machine learning processes to reconstruct images based on image data captured by nuclear imaging systems. For example, the embodiments can employ machine learning processes that are applied to varying types of image data (e.g., CT image data, NAC PET measurement data, topogram data, optimal image data, etc.) to generate a final synthetic image (e.g., a final synthetic CT image) and, in some examples, a corresponding organ mask. While each of the varying types of image data may capture a limited view of a subject (e.g., a patient), the final synthetic image captures a more encompassing view of the subject. For instance, while an NAC PET image may capture an entire view of a patient (e.g., head to toe), a corresponding co-modality image may only capture a portion of the patient (e.g., lower body, midsection, upper body, etc.). As known in the art, a co-modality image is another image, such as a CT or MR image, received in addition to an original image, such as the NAC PET image. Thus, an attenuation map generated based solely on the co-modality image would not cover all portions of the subject as the NAC PET image. Among reasons for the limited view of the co-modality image would be to reduce the amount of dosage given to the patient.

The embodiments described herein may "extend" a co-modality image by generating a final synthetic image that includes a broader view of the patient, in some examples to a same view as the NAC PET image. For example, in addition to a NAC PET (or NAC SPECT) image, one or more additional images may be received. The additional images may include, for instance, a co-modality image (e.g., CT image), an x-ray image (e.g., topogram), and/or an optical image. The views of the one or more additional images, when considered together, may correspond to a view of the NAC PET image. For example, while the NAC PET image may cover an entire subject (e.g., head to toe), a co-modality image may cover only a portion of the subject. Similarly, each of the x-ray image and/or optimal image may cover a portion of the subject. The portions of the subject covered by each of the co-modality, x-ray, and optical images together may cover the entire subject. As described further herein, one or more machine learning processes may be applied to the NAC PET image and the additional images to generate a final synthetic image that also covers the entire subject.

In some examples, an attenuation map (e.g., a "full-view" attenuation map) may be generated based on the final synthetic image. Further, the NAC PET image may be corrected for attenuation and scatter based on the generated attenuation map. The generated attenuation map may cover all lines of response, thus providing a more complete, and accurate, attenuation and scatter correction of the NAC PET image compared to conventional methods.

Further, and as described herein, the one or more machine learning processes may be applied to the NAC PET image and the additional images to generate a segmentation mask (e.g., organ mask). As recognized in the art, a segmentation mask may identify and/or isolate portions of an image. For instance, a segmentation mask may identify and/or isolate portions of an image that include organs. The segmentation mask may allow for a more accurate computation of medical metrics, such as organ contribution percentages, as the segmentation mask would identify corresponding organs in their entirety.

Referring now to the drawings, FIG. 1 illustrates one embodiment of a nuclear imaging system 100. As illustrated, nuclear imaging system 100 includes image scanning system 102, image reconstruction system 104, and one or more data repositories 116. Image scanning system 102 can be a nuclear image scanner such as, for instance, a PET/CT scanner or a SPECT/CT scanner. Image scanning system 102 can scan a subject (e.g., a person) and, based on the scan, generate NAC measurement data 105 characterizing a nuclear scan. The NAC measurement data 105 may be, for example, non-attenuation corrected PET or SPECT raw data, such as sinogram data. The NAC measurement data 105 can represent anything imaged in the scanner's FOV containing, for a PET scanner, positron emitting isotopes, and for a SPECT scanner, gamma rays. For example, the NAC measurement data 105 can represent whole-body image scans, such as image scans from a patient's head to the patient's thigh or toe. Image scanning system 102 may transmit the NAC measurement data 105 to image reconstruction system 104.

Image scanning system 102 can also generate additional images. For example, image scanning system 102 may generate CT image data 103 characterizing a CT scan of the patient. The CT scan may have a limited FOV compared to the nuclear scan characterized by the NAC measurement data 105, for example. Image scanning system 102 may also capture x-rays of the patient, and may generate topogram data 107 characterizing each x-ray. While the CT image data 103 may characterize a three-dimensional scan of at least a portion of the patient, the topogram data 107 characterizes a two-dimensional scan of at least a portion of the patient. In some instances, image scanning system 102 can capture an optical image (e.g., 2D or 3D optical image) of at least a portion of the patient, and can generate optical image data 109 characterizing each optical image. The optical images may be captured by one or more cameras (e.g., 2D or 3D cameras) of the image scanning system 102, for example. Image scanning system 102 may transmit each of the additional images, including CT image data 103, topogram data 107, and optical image data 109, to image reconstruction system 104.

As illustrated, image reconstruction system 104 includes synthesis engine 110, attenuation map generation engine 120, and image volume reconstruction engine 130. FIGS. 2A, 2B, 3A, 3B, 4A, and 4B, discussed further below, illustrate exemplary portions of the synthesis engine 110 of FIG. 1. All or portions of each of synthesis engine 110, attenuation map generation engine 120, and image volume reconstruction engine 130 can be implemented in hardware, such as in one or more field-programmable gate arrays (FPGAs), one or more application-specific integrated circuits (ASICs), one or more state machines, one or more computing devices, digital circuitry, or any other suitable circuitry. In some examples, parts or all of synthesis engine 110, attenuation map generation engine 120, and image volume reconstruction engine 130 can be implemented in software as executable instructions such that, when executed by one or more processors, cause the one or more processors to perform respective functions as described herein. The instructions can be stored in a non-transitory, computer-readable storage medium, for example, and read by the one or more processors to carry out the functions.

Referring to FIG. 1, synthesis engine 110 may receive NAC measurement data 105 and any of the additional images, including one or more of CT image data 103, topogram data 107, and optical image data 109. Synthesis engine 110 may perform any of the operations described herein to generate predicted CT image data 111 characterizing a final synthetic CT image, and a corresponding final segmentation mask 113 a final segmentation mask 113 that identifies organs of the subject. For example, synthesis engine 110 may receive NAC measurement data 105 and one or more of CT image data 103, topogram data 107, and optical image data 109, and may apply one or more trained machine learning processes to the NAC measurement data 105 and one or more of the CT image data 103, topogram data 107, and optical image data 109 to generate the predicted CT image data 111 and final segmentation mask 113.

While the CT image data 103, topogram data 107, and optical image data 109 may capture a limited view of the subject with respect to the view of the nuclear scan characterized by the NAC measurement data 105, the final synthetic CT image represents a view of the subject similar to (e.g., equivalent to) the view of the nuclear scan. For instance, NAC measurement data 105 may characterize a full view of a subject (e.g., head to thigh, head to toe). In some examples, each of the CT image data 103 and topogram data 107 may cover views of respective portions of the subject, which may or may not overlap with each other. The portions of view of the subject covered by the CT image data 103 and topogram data 107, at least in combination, may cover the full view of the subject. For example, the CT image data 103 may cover from the subject's head to the subject's chest area, while the topogram data 107 may cover from the subject's chest area to the subject's toe.

Figure 2A:
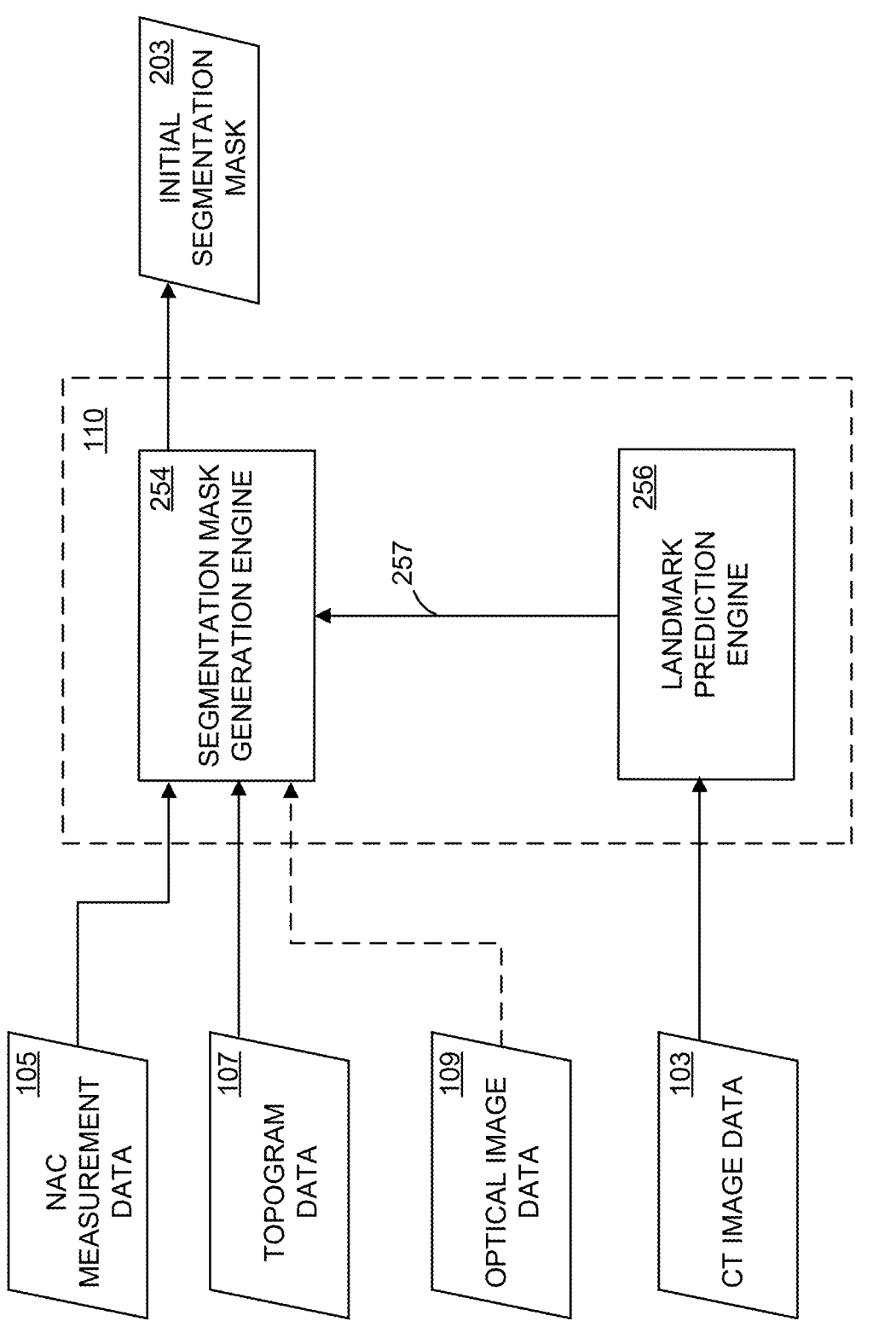
FIGS. 2A, 2B, 3A, 3B, 4A, and 4B illustrate exemplary portions of the nuclear image reconstruction system of FIG. 1, in accordance with some embodiments.

FIGS. 2A, 2B, 3A, 3B, 4A, and 4B illustrate exemplary portions of synthesis engine 110. For instance, FIG. 2A illustrates a landmark prediction engine 256 that receives the CT image data 103, and applies a landmarking algorithm to the CT image data 103 to generate location data 257 characterizing anatomical landmarks. The location data 257 may define points within the CT image data 103 that define each organ, organ features, etc. The landmarking algorithm may be a machine learning model trained on various medical images across various modalities, such as the Automatic Landmarking and Parsing of Human Anatomy (ALPHA) model, a Siemens Healthineers® proprietary technology. The segmentation mask generation engine 254 receives the location data 257 from the landmark prediction engine 256, and further receives the NAC measurement data 105, and any of the received additional images, such as the images characterized by the topogram data 107 and the optical image data 109. The NAC measurement data 105, and any of the received additional images, such as the images characterized by the topogram data 107 and the optical image data 109, together may capture a full view of a subject, as described herein.

Further, segmentation mask generation engine 254 applies a segmentation process to the NAC measurement data 105, and of the received topogram data 107 and optical image data 109, and the location data 257 to generate an initial segmentation mask 203. The segmentation process may be based on a trained machine learning model, such as a trained encoder-decoder model, a trained deep learning network (e.g., trained convolutional neural network (CNN)), or any other suitably trained machine learning model. The segmentation mask generation engine 254 may generate features based on the NAC measurement data 105, and of the received topogram data 107 and optical image data 109, and the location data 257, and may input the features to the trained machine learning model. Based on the inputted features, the trained machine learning model may output the initial segmentation mask 203. In some examples, the machine learning model is trained using supervised learning. For instance, the segmentation process may be trained with labelled PET measurement data, labelled topogram data, and corresponding location data, for instance.

Figure 2B:
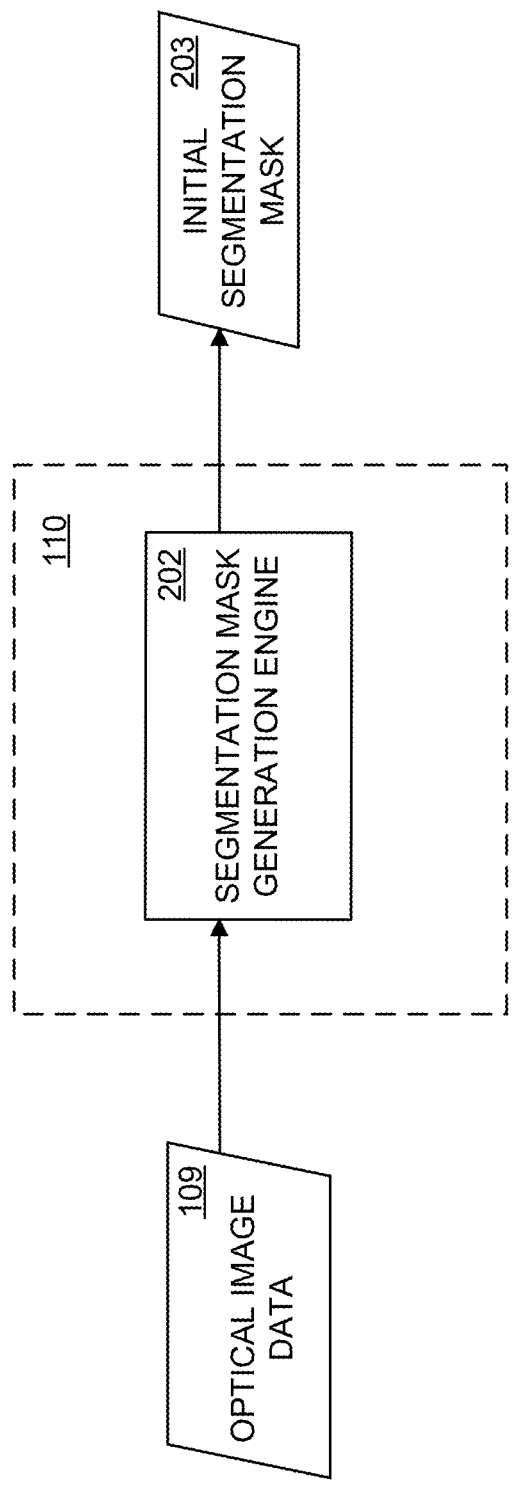

In some examples, optical image data 109 may characterize an image of a full view of a subject. In these instances, as illustrated in FIG. 2B, a segmentation mask generation engine 202 may apply a segmentation process to the optical image data 109 to generate the initial segmentation mask 203. For instance, the segmentation process may be based on a trained deep learning network, such as a trained CNN. The segmentation mask generation engine 202 may generate features based on the optical image data 109, and may input the features to the trained deep learning network. Based on the inputted features, the trained deep learning network may output the initial segmentation mask 203. In some examples, the deep learning network is trained based on labelled optical images. For instance, the optical images may include labels identifying contours of various organs captured within the optical images.

In some examples, the synthesis engine 110 determines to generate the initial segmentation mask 203 using the process described with respect to FIG. 2B when optical image data

109 is received. Otherwise, if optical image data 109 is not received, the synthesis engine 110 determines to generate the initial segmentation mask 203 using this process described with respect to FIG. 2A.

Referring back to FIG. 1, the one or more trained machine learning processes may be applied to the NAC measurement data 105 and the initial segmentation mask 203 to generate a corresponding synthetic image (e.g., a predicted synthetic CT image). The one or more trained machine learning processes may also be applied to each combination of the CT image data 103 and the initial segmentation mask 203, the topogram data 107 and the initial segmentation mask 203, and, optionally, the optical image data 109 and the initial segmentation mask 203, to generate corresponding synthetic images. Each of the generated synthetic images may capture a predetermined view of the subject, such as a full view of the subject.

Figure 3A:
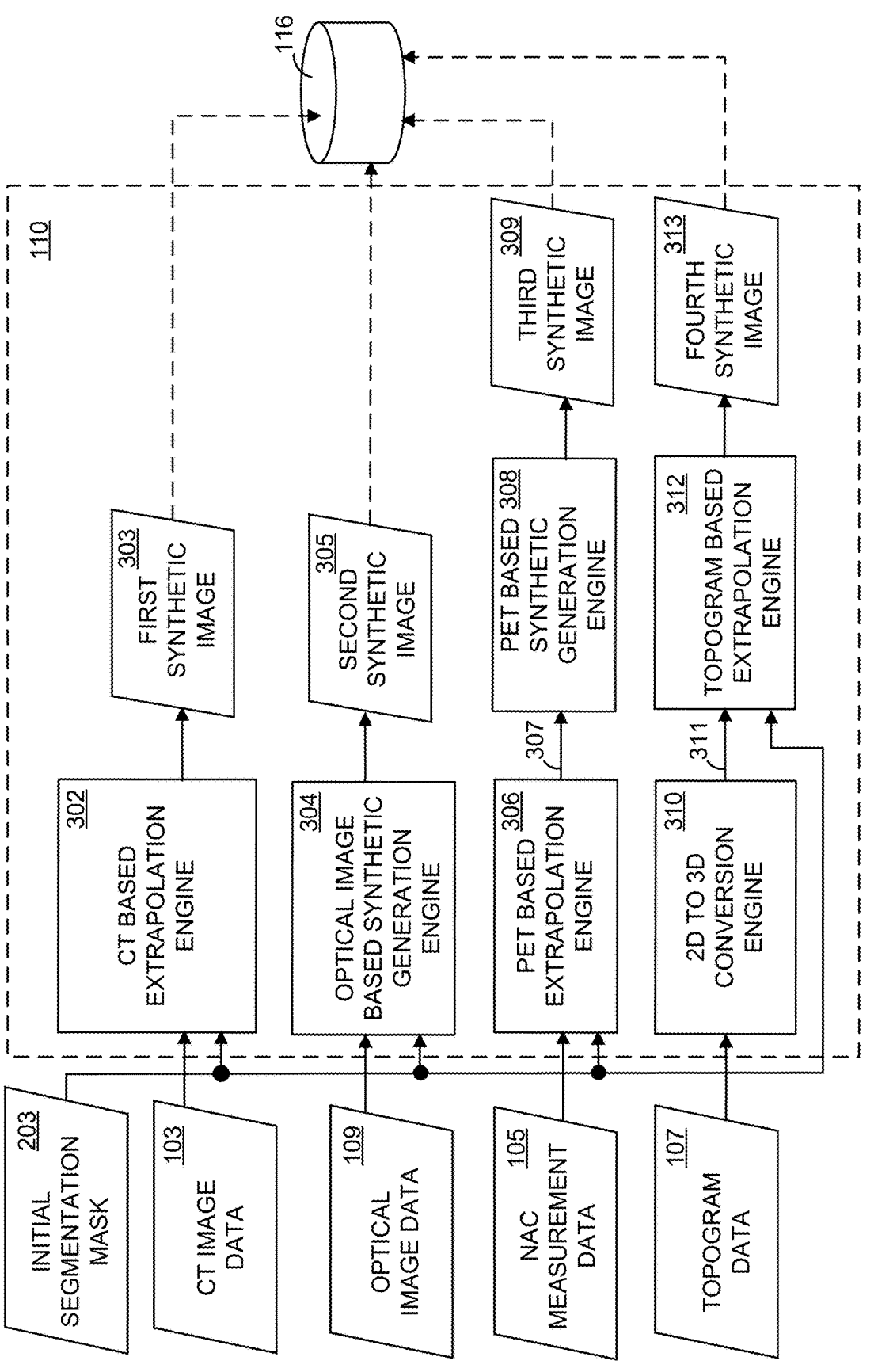

For example, FIG. 3A illustrates a CT based extrapolation engine 302 that applies a trained machine learning process to the initial segmentation mask 203 and the CT image data 103 to generate a first synthetic image 303. The machine learning process is trained to extrapolate CT images from a partial view to a predetermined view (e.g., head to chest, chest to toe, full view, etc.), for instance. The trained machine learning process may be based on a deep learning model, such as a diffusion model, a Generative Adversarial Network (GAN), or a CNN. For example, CT based extrapolation engine 302 may generate features based on the initial segmentation mask 203 and the CT image data 103, and may input the features to the trained deep learning model. Based on the inputted features, the trained deep learning model outputs the first synthetic image 303.

Additionally, optical image based synthetic generation engine 304 applies a trained machine learning process to the initial segmentation mask 203 and the optical image data 109 to generate a second synthetic image 305. For instance, the trained machine learning process may be based on an encoder-decoder model, or a deep learning model, such as a diffusion model, GAN, or a CNN. For example, optical image based synthetic generation engine 304 may generate features based on the initial segmentation mask 203 and the optical image data 109, and may input the features to the trained deep learning model. Based on the inputted features, the trained deep learning model outputs the second synthetic image 305.

Further, PET based extrapolation engine 306 applies a trained machine learning process to the initial segmentation mask 203 and the NAC measurement data 105 to generate a PET extrapolated image 307 that covers a predetermined view (e.g., head to chest, chest to toe, full view, etc.) of the subject. The machine learning process is trained to extrapolate nuclear images from a partial view to the predetermined view, for instance. The trained machine learning process may be based on a deep learning model, such as a diffusion model, a Generative Adversarial Network (GAN), or a CNN.

PET based synthetic generation engine 308 may receive the PET extrapolated image 307, and may apply an additional trained machine learning process to the PET extrapolated image 307 to generate a third synthetic image 309. The additional trained machine learning process may be based on a deep learning model, such as a diffusion model, a Generative Adversarial Network (GAN), or a CNN. For example, PET based synthetic generation engine 308 may generate features based on the PET extrapolated image 307, and may input the features to the additional trained deep learning model. Based on the inputted features, the additional trained deep learning model outputs the third synthetic image 309.

In addition, 2D to 3D conversion engine 310 applies a 2D-to-3D conversion process to the topogram data 107 to convert the topogram data 107 to a 3D optical image 311. The 2D-to-3D conversion process is configured (e.g., trained) to convert 2D images to 3D images. For instance, the 2D-to-3D conversion process may be based on a 2D-to-3D conversion algorithm, computer vision model, or deep learning model, such as a diffusion model, a Generative Adversarial Network (GAN), or a CNN.

Topogram based extrapolation engine 312 may receive the 3D optical image 311 and the initial segmentation mask 203, and may apply a trained machine learning process to the 3D optical image 311 and the initial segmentation mask 203 to generate a fourth synthetic image 313. The trained machine learning process may be based on a deep learning model, such as a diffusion model, a Generative Adversarial Network (GAN), or a CNN, and is trained extrapolate the 3D optical image 311 to a predetermined view of the subject based on the initial segmentation mask 203. For example, topogram based extrapolation engine 312 may generate features based on the 3D optical image 311 and the initial segmentation mask 203, and may input the features to the trained deep learning model. Based on the inputted features, the trained deep learning model outputs the fourth synthetic image 313.

As illustrated, in some examples, synthesis engine 110 stores one or more of the generated first synthetic image 303, second synthetic image 305, third synthetic image 309, and fourth synthetic image 313 within data repository 116.

Referring back to FIG. 1, the one or more trained machine learning processes may be applied to the synthetic images to fuse the synthetic images and generate predicted CT image data 111 characterizing a final synthetic image. In some instances, location data is generated based on the CT image data 103, or may be received from the image scanning system 102. The location data may identify anatomical landmarks, such as organ feature locations, within the CT image data 103. The one or more trained machine learning processes may be applied to the location data and the synthetic images to fuse the synthetic images and generate the predicted CT image data 111. In some examples, the synthesis engine 110 may perform operations to register the predicted CT image data 111 to the NAC measurement data 105 and/or the CT image data 103, thereby generating corresponding final registered synthetic images (i.e., the predicted CT image data 111 registered to the NAC measurement data 105 and/or the predicted CT image data 111 registered to the CT image data 103).

Figure 3B:
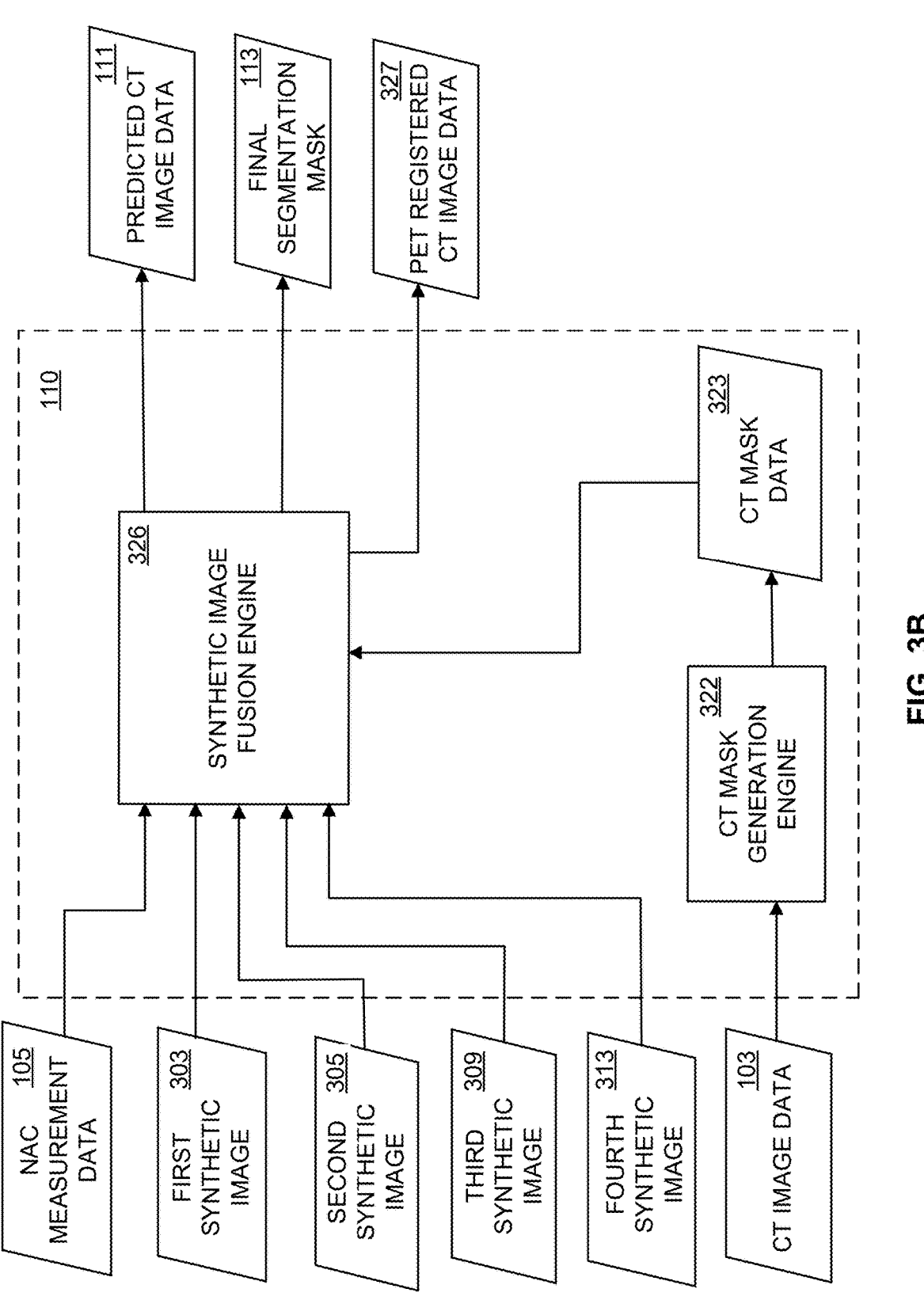

For example, and with reference to FIG. 3B, CT mask generation engine 322 receives CT image data 103, and generates CT mask data 323 characterizing a segmentation mask (e.g., organ mask) based on the CT image data 103. CT mask generation engine 322 may apply any suitable segmentation algorithm (e.g., trained machine learning model) as known in the art to the CT image data 103 to generate the segmentation mask. As described herein, CT image data 103 may characterize a CT image with a partial view of a subject (e.g., image scanning device 102 captures a CT scan using an FOV with the partial view of the subject). As such, the CT mask data 323 may characterize a segmentation mask with a corresponding partial view of the subject.

Further, synthetic image fusion engine 326 receives the CT mask data 323 from the CT mask generation engine 322, as well as each of the first synthetic image 303, second synthetic image 305, third synthetic image 309, and fourth synthetic image 313 (e.g., from topogram based extrapolation engine 312). Synthetic image fusion engine 326 performs operations to fuse each of the first synthetic image 303, second synthetic image 305, third synthetic image 309, and fourth synthetic image 313 (e.g., predicted synthetic images) to generate predicted CT image data 111 characterizing a final predicted synthetic image (e.g., a single predicted synthetic CT image), and performs further operations to generate the final segmentation mask 113.

For instance, the synthetic image fusion engine 326 may apply a trained machine learning process to the CT mask data 323 and the first synthetic image 303, second synthetic image 305, third synthetic image 309, and fourth synthetic image 313 to generate predicted CT image data 111 characterizing a final predicted synthetic image. The trained machine learning process may be based on a deep learning model (e.g., diffusion model, GAN, CNN), for instance.

The machine learning process may be trained to automatically determine and extract relevant features from each modality, such as implants detected from the fourth synthetic image 313 (generated based on the topogram data 107), and to generate a final predicted synthetic image based on the relevant features. For instance, the machine learning process may be trained based on labelled synthetic images for various modalities (e.g., PET, optical, topogram, CT, etc.). During training, the machine learning process may learn values of various weights that are applied to image data for the various modalities, as well as weights applied for various relevant features detected within the image data. Once trained, the synthetic image fusion engine 326 may input features generated from the CT mask data 323 and the first synthetic image 303, second synthetic image 305, third synthetic image 309, and fourth synthetic image 313, to the trained machine learning process, and the trained machine learning process may apply the learned weights to the corresponding inputted features to generate the predicted CT image data 111.

Further, the synthetic image fusion engine 326 may apply one or more segmentation processes to the predicted CT image data 111 to generate the final segmentation mask 113. The segmentation process may be based on a trained machine learning model, such as a trained encoder-decoder model, a trained deep learning network (e.g., trained convolutional neural network (CNN)), or any other suitably trained machine learning model. For instance, the machine learning model may be trained on labelled synthetic images (e.g., synthetic CT images labelled to identify organs and/or organ features (e.g., organ contours, dimensions, etc.)).

Figure 4A:
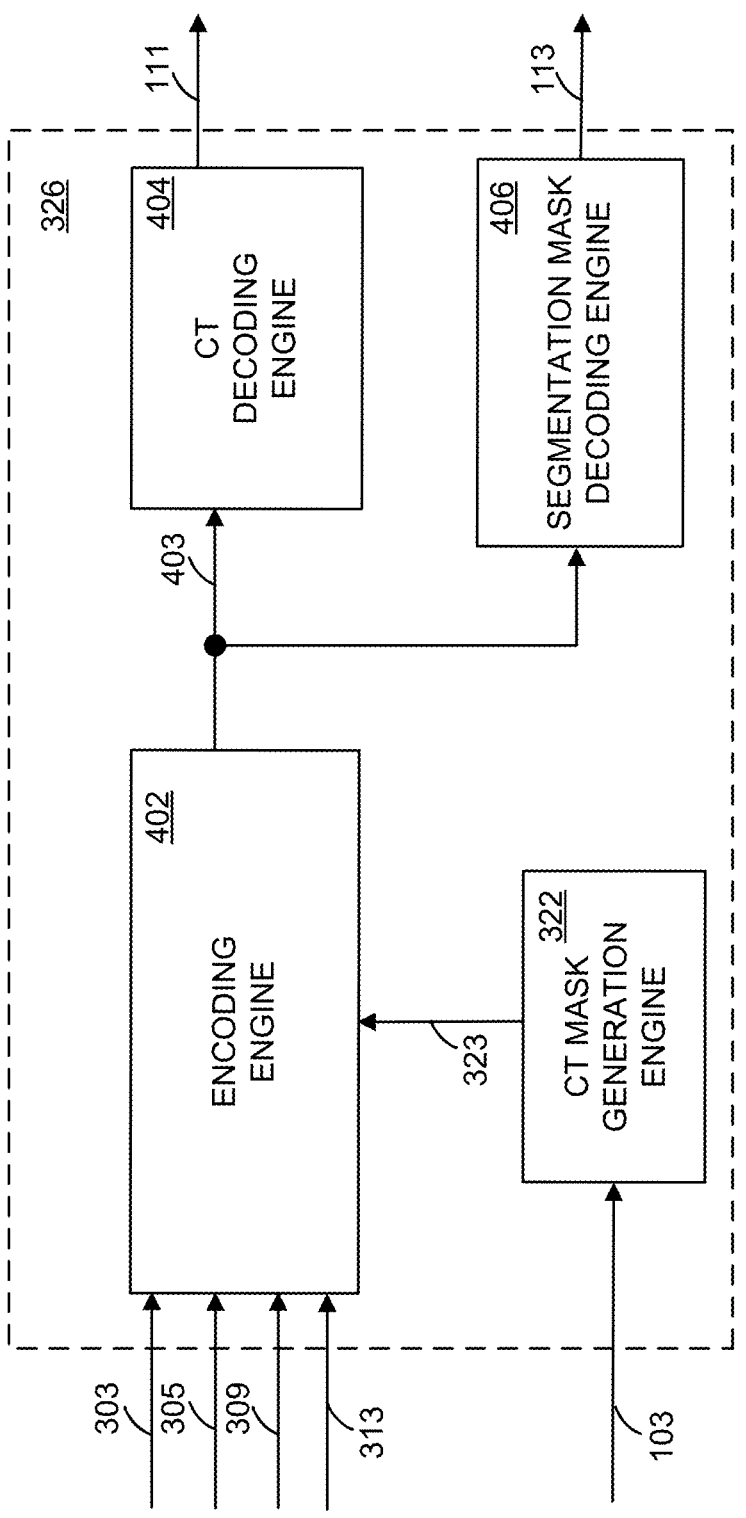

FIG. 4A illustrates an example of synthetic image fusion engine 326 employing a trained encoding-decoding process, such as an auto-encoding process, to generate predicted CT image data 111 and final segmentation mask 113. As illustrated, an encoding engine 402 receives, and applies an encoding process to, the first synthetic image 303, the second synthetic image 305, the third synthetic image 309, the fourth synthetic image 313, and the CT mask data 323. Based on application of the encoding process to the synthetic images and the CT mask data 323, the encoding engine 402 generates encoded features 403, and provides the encoded features 403 to each of CT decoding engine 404 and segmentation mask decoding engine 406.

CT decoding engine 404 applies a decoding process to the encoded features 403 to generate the predicted CT image data 111. Similarly, segmentation mask decoding engine 406 applies a decoding process to the encoded features 403 to generate the final segmentation mask 113. In some examples, for feature propagation purposes among other reasons, one or more skip connections are provided from the encoding engine 402 to one, or both, of the CT decoding engine 404 and the segmentation mask decoding engine 406. The skip connections allow encoded features from one layer of the encoder of the encoding engine 402 to be provided to another layer (e.g., a corresponding layer) of the decoder of each decoding engine 404, 406.

Figure 4B:
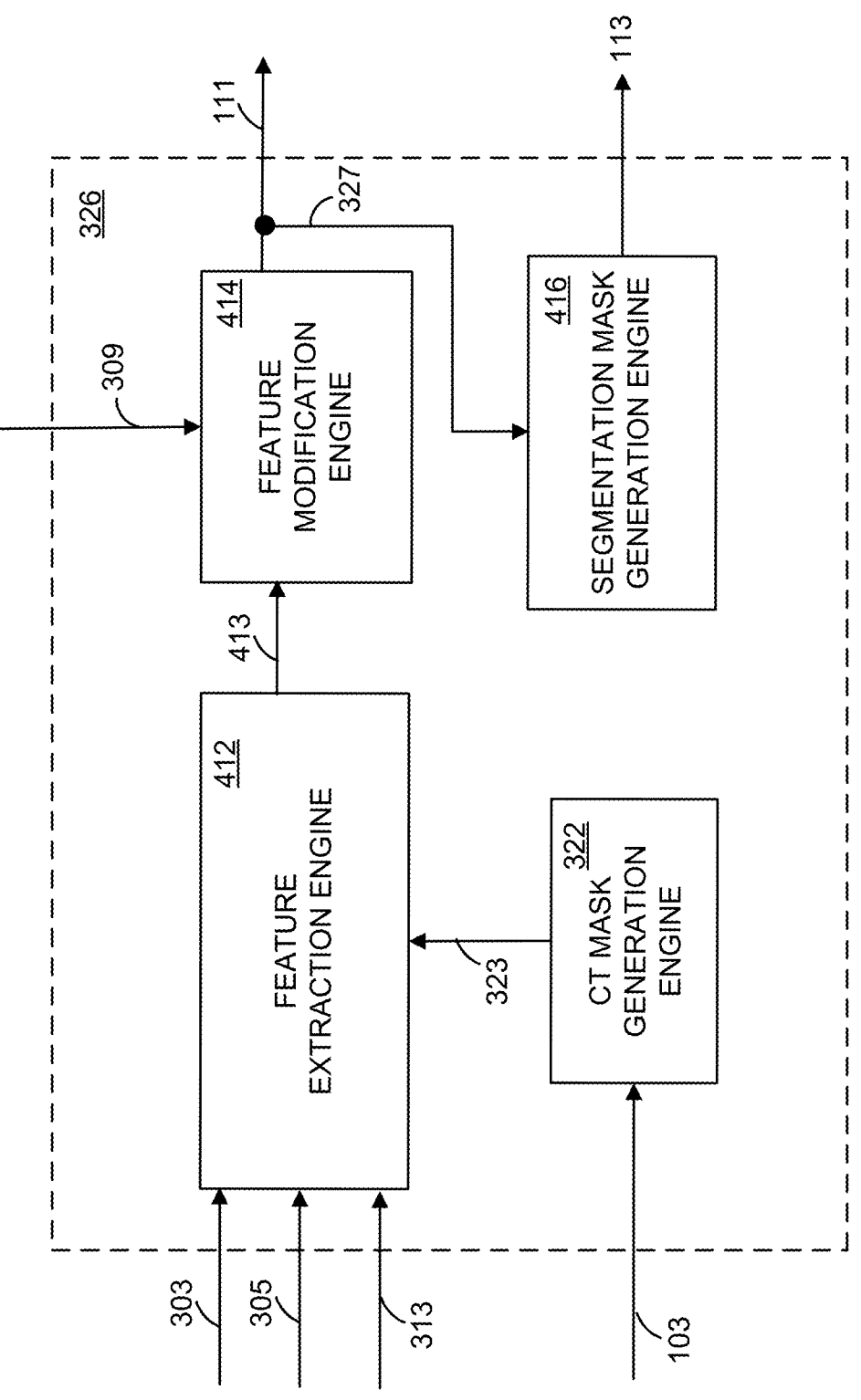

FIG. 4B illustrates an alternate example of synthetic image fusion engine 326. In this example, a feature extraction engine 412 receives the first synthetic image 303, the second synthetic image 305, the fourth synthetic image 313, and the CT mask data 323, and applies a feature extraction process to extract features from one or more of the first synthetic image 303, the second synthetic image 305, the fourth synthetic image 313, and, optionally, the CT mask data 323. For example, the feature extraction engine 412 may apply the feature extraction process to the fourth synthetic image 313 (e.g., the topogram predicted synthetic image) and, based on applying the feature extraction process, may identify implants within the fourth synthetic image 313. Similarly, the feature extraction engine 412 may apply the feature extraction process to the second synthetic image 305 (e.g., the optical image predicted synthetic image) and, based on applying the feature extraction process, may identify organ locations (e.g., major organ locations) within the second synthetic image 305, which may be located outside a field-of-view of the first synthetic image 303 and the third synthetic image 309, for instance. Feature extraction engine 412 provides feature data 413 characterizing the extracted features to the feature modification engine 414.

Feature modification engine 414 receives the feature data 413 and the third synthetic image 309 (generated based on NAC measurement data 105), modifies the feature data 413 based on the third synthetic image 309. For instance, feature modification engine 414 may apply a trained machine learning process, such as one based on a CNN or GAN, to the feature data 413 and the third synthetic image 309, and based on the application of the trained machine learning process, generates the modified features. Feature modification engine 414 then generates the predicted CT image data 111 based on the modified features.

Further, segmentation mask generation engine 416 receives the predicted CT image data 111 from feature modification engine 414, and applies a segmentation process to the predicted CT image data 111 to generate the final segmentation mask 113. The segmentation process may be based on a trained machine learning model, such as a trained encoder-decoder model, a trained deep learning network (e.g., trained convolutional neural network (CNN)), or any other suitably trained machine learning model. For instance, the machine learning model may be trained on labelled synthetic images (e.g., synthetic images labelled to identify organs and/or organ features (e.g., organ contours, dimensions, etc.)).

Referring back to FIG. 3B, in some examples, synthetic image fusion engine 326 performs operations to register the predicted CT image data 111 to the nuclear image characterized by the NAC measurement data 105. For instance, synthetic image fusion engine 326 may apply a registration process (e.g., algorithm) to the NAC measurement data 105 and the predicted CT image data 111 to align the NAC measurement data 105 and the predicted CT image data 111 according to anatomical features (e.g., alignment of corresponding organs), and generate PET registered CT image data 327 characterizing the aligned NAC measurement data 105 and predicted CT image data 111.

Referring back to FIG. 1, attenuation map generation engine 120 receives the extended CT image data 111 from the synthesis engine 110, and generates an attenuation map 121 based on the extended CT image data 111. For example, attenuation map generation engine 120 may apply a trained neural network process, such as a deep convolutional neural network process, to the extended CT image data 111 to generate the attenuation map 121.

Further, image volume reconstruction engine 130 may perform processes to correct the nuclear image characterized by the NAC measurement data 105 based on the attenuation map 121. For example, image volume reconstruction engine 104 may execute an Ordered Subsets Expectation-Maximization (optionally with time-of-flight and/or point spread function) process or Filtered BackProjection process to the NAC measurement data 105 and the attenuation map 121 to generate the final image volume 191. Final image volume 191 can include image data that can be provided for display and analysis, for example. In some examples, image volume reconstruction engine 104 stores the final image volume 191 in data repository 116.

In some examples, image volume reconstruction engine 104 (e.g., via one or more processors executing instructions, as described herein) trains any of the machine learning processes described herein. For example, image volume reconstruction engine 104 may input features generated from corresponding training data to any of the machine learning models described herein, and may execute the machine learning models to generate output data. The output data may characterize a predicted synthetic CT image and a corresponding segmentation mask, for example. Image reconstruction engine 104 may determine whether the machine learning model is made based on the output data. For example, image volume reconstruction engine 104 may determine at least one metric based on the predicted synthetic CT image and/or corresponding segmentation mask. For instance, image volume reconstruction engine 104 may compute, based on an outputted predicted synthetic CT image, a mean squared error, a mean absolute error, and/or an adversarial loss. Further, image volume reconstruction engine 104 may compute, based on an outputted segmentation mask, a precision score, a recall score, a loss function, dice-score, and/or an F1 score. If the at least one metric satisfies a corresponding threshold, the image volume reconstruction engine 104 determines that training of the machine learning process is complete. Otherwise, if the at least one metric does not satisfy the corresponding threshold, the image volume reconstruction engine 104 continues to train the machine learning process based on features generated from additional corresponding data.

FIG. 5 illustrates a computing device 500 that can be employed by the image reconstruction system 104. Computing device 500 can implement, for example, one or more of the functions of image reconstruction system 104 described herein, such as any of the functions described with respect to the synthesis engine 110.

Computing device 500 can include one or more processors 501, working memory 502, one or more input/output devices 503, instruction memory 507, a transceiver 504, one or more communication ports 507, and a display 506, all operatively coupled to one or more data buses 508. Data buses 508 allow for communication among the various devices. Data buses 508 can include wired, or wireless, communication channels.

Processors 501 can include one or more distinct processors, each having one or more cores. Each of the distinct processors can have the same or different structure. Processors 301 can include one or more central processing units (CPUs), one or more graphics processing units (GPUs), one or more application specific integrated circuits (ASICs), one or more digital signal processors (DSPs), one or more processing cores, and the like.

Processors 501 can be configured to perform a certain function or operation by executing code, stored on instruction memory 507, embodying the function or operation. For example, processors 501 can be configured to perform one or more of any function, method, or operation disclosed herein.

Instruction memory 507 can store instructions that can be accessed (e.g., read) and executed by processors 501. For example, instruction memory 507 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. For example, instruction memory 507 can store instructions that, when executed by one or more processors 501, cause one or more processors 501 to perform one or more of the functions of image reconstruction system 104, such as one or more of the synthesis engine 100 functions, one or more of the attenuation map generation engine 120 functions, and one or more of the image volume reconstruction engine 130 functions, described herein.

Processors 501 can store data to, and read data from, working memory 502. For example, processors 501 can store a working set of instructions to working memory 502, such as instructions loaded from instruction memory 507. Processors 501 can also use working memory 502 to store dynamic data created during the operation of computing device 500. For example, processors 501 may store parameters, such as hyperparameters and weights, associated with any of the algorithms and models (e.g., machine learning models) described herein. Working memory 502 can be a random access memory (RAM) such as a static random access memory (SRAM) or dynamic random access memory (DRAM), or any other suitable memory.

Input/output devices 503 can include any suitable device that allows for data input or output. For example, input/output devices 503 can include one or more of a keyboard, a touchpad, a mouse, a stylus, a touchscreen, a physical button, a speaker, a microphone, or any other suitable input or output device.

Communication port(s) 507 can include, for example, a serial port such as a universal asynchronous receiver/transmitter (UART) connection, a Universal Serial Bus (USB) connection, or any other suitable communication port or connection. In some examples, communication port(s) 507 allows for the programming of executable instructions into instruction memory 507. In some examples, communication port(s) 507 allow for the transfer (e.g., uploading or downloading) of data, such as of the uploading of machine learning model parameters.

Display 506 can display user interface 505. User interface 505 can enable user interaction with computing device 500. For example, user interface 505 can be a user interface for an application that allows for the viewing of final image volume 191. In some examples, a user can interact with user interface 505 by engaging an input/output device 503. In some examples, display 506 can be a touchscreen, where user interface 505 is displayed on the touchscreen.

Transceiver 504 allows for communication with a network, such as a Wi-Fi network, an Ethernet network, a cellular network, or any other suitable communication network. For example, if operating in a cellular network, transceiver 504 is configured to allow communications with the cellular network. One or more processors 501 are operable to receive data from, or send data to, a network via transceiver 504.

FIG. 6 is a flowchart of an example method 600 to reconstruct an image. The method can be performed by one or more computing devices, such as computing device 500, executing instructions, such as the instructions stored in instruction memory 507.

Beginning at block 602, a partial CT image, a NAC PET image, and an x-ray image are received. For example, and as described herein, image reconstruction system 104 may receive CT image data 103, NAC measurement data 105, and topogram data 107. Each of the CT image data 103, NAC measurement data 105, and topogram data 107 may be received from image scanning system 102, or received from data repository 116, for example. At block 604, location data is generated based on applying a first machine learning process to the partial CT image. The location data identifies feature locations within the partial CT image. For instance, as described herein, image reconstruction system 104 may apply a landmarking algorithm to the CT image data 103 to generate location data 257 characterizing anatomical landmarks.

Proceeding to block 606, a segmentation mask is generated based on applying a second machine learning process to the NAC PET image, the x-ray image, and the location data. For instance, as described herein, image reconstruction system 104 may apply a segmentation process to the NAC measurement data 105, the topogram data 107, and the location data 257 to generate an initial segmentation mask 203.

Further, at block 608 a plurality of synthetic images are generated based on applying at least a third machine learning process to the segmentation mask, the partial CT image, the NAC PET image, and the x-ray image. For instance, and as described herein, image reconstruction system 104 may apply one or more trained machine learning processes to each combination of the CT image data 103 and the initial segmentation mask 203, the NAC measurement data 105 and the initial segmentation mask 203, and the topogram data 107 and the initial segmentation mask 203, to generate corresponding synthetic images, e.g., first synthetic image 303, third synthetic image 305, and fourth synthetic image 313.

At block 610, a final synthetic CT image and a corresponding organ mask are generated based on applying at least a fourth machine learning process to the plurality of synthetic images and to a CT mask for the partial CT image. For example, as described herein, the image reconstruction system 104 may generate CT mask data 323 characterizing a segmentation mask (e.g., organ mask) based on applying a segmentation algorithm to the CT mask data 323. CT mask generation engine 322 may apply any suitable segmentation algorithm (e.g., trained machine learning model) as known in the art to generate the segmentation mask. Further, the image reconstruction system 104 may apply a trained machine learning process to the CT mask data 323, the first synthetic image 303, and the third synthetic image 309 to generate the predicted CT image data 111 characterizing a final predicted synthetic image. The trained machine learning process may be based on a deep learning model (e.g., diffusion model, GAN, CNN), for instance. The final synthetic CT image and corresponding organ mask may be stored in a data repository, such as data repository 116.

Figure 7:
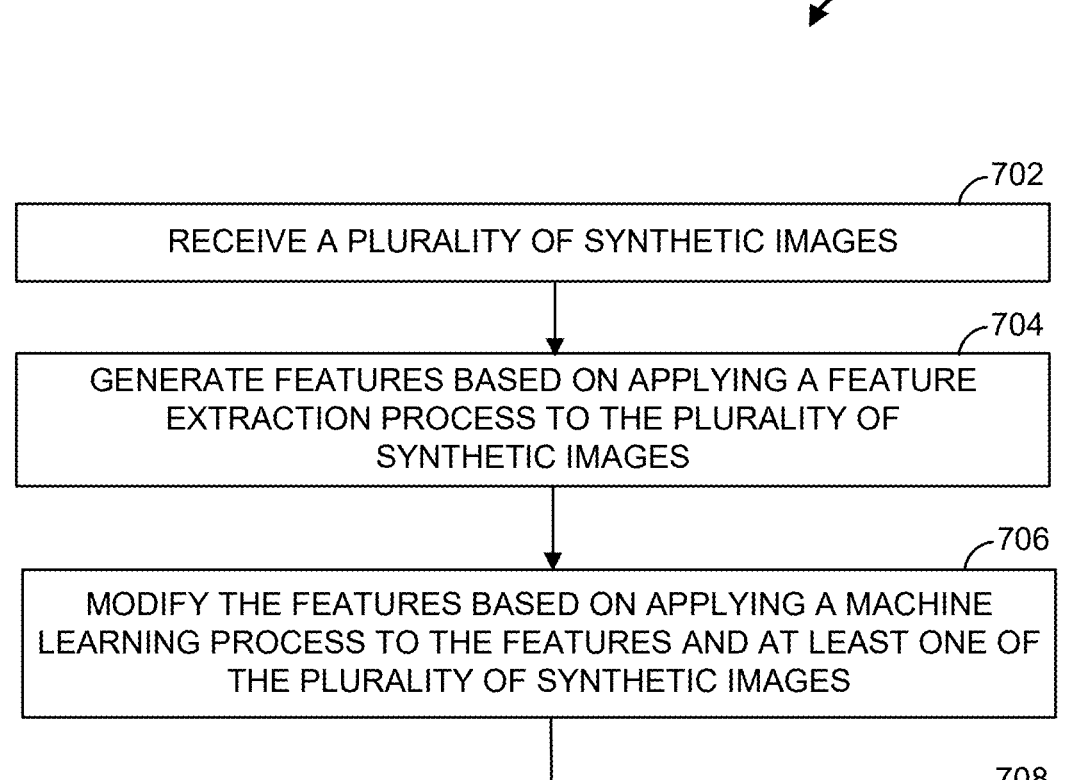
FIG. 7 is a flowchart of an example method to generate and fuse synthetic images, in accordance with some embodiments.

FIG. 7 is a flowchart of an example method 700 to generate and fuse synthetic images. The method can be performed by one or more computing devices, such as computing device 500, executing instructions, such as the instructions stored in instruction memory 507.

Beginning at block 702, a plurality of synthetic images are received. The plurality of synthetic images may include, for example, one or more of the first synthetic image 303, the second synthetic image 305, the third synthetic image 309, and the fourth synthetic image 313. At block 704, features are generated based on applying a feature extraction process to the plurality of synthetic images. For example, as described herein, the image reconstruction system 104 may apply a feature extraction process to extract features from one or more of the first synthetic image 303, the second synthetic image 305, and the fourth synthetic image 313, and generates feature data 413 characterizing the extracted features.

Further, at block 706, the features are modified based on applying a trained machine learning process to the features and at least one of the plurality of synthetic images. For instance, and as described herein, image reconstruction system 104 may modify the feature data 413 based on the third synthetic image 309. For instance, image reconstruction system 104 may apply a trained machine learning process, such as one based on a CNN or GAN, to the feature data 413 and the third synthetic image 309, and based on the application of the trained machine learning process, generate the modified features. At block 708, a final synthetic CT image (e.g., the predicted CT image data 111) is generated based on the modified features.

The following is a list of non-limiting illustrative embodiments disclosed herein:

Illustrative Embodiment 1: A computer-implemented method comprising:

receiving a co-modality image, a non-attenuated corrected nuclear image, and an x-ray image;

applying a first machine learning process to the co-modality image and, based on the application of the first machine learning process, generating location data identifying feature locations;

applying a second machine learning process to the non-attenuated corrected nuclear image, the x-ray image, and the location data and, based on the application of the second machine learning process, generating a segmentation mask;

applying at least a third machine learning process to the segmentation mask, the co-modality image, the non-attenuated corrected nuclear image, and the x-ray image, and based on the application of the at least third machine learning process, generating a plurality of synthetic images; and applying at least a fourth machine learning process to the plurality of synthetic images and, based on the application of the at least fourth machine learning process, generating a final synthetic image.

Illustrative Embodiment 2: The computer-implemented method of illustrative embodiment 1 further comprising generating a final segmentation mask based on the final synthetic image.

Illustrative Embodiment 3: The computer-implemented method of any of illustrative embodiments 1-2 further comprising generating an attenuation map based on the final synthetic image.

Illustrative Embodiment 4: The computer-implemented method of any of illustrative embodiments 1-3 comprising:

receiving an optical image;

applying the second machine learning process to the optical image; and applying the at least third machine learning process to the optical image.

Illustrative Embodiment 5: The computer-implemented method of any of illustrative embodiments 1-4, wherein each of the co-modality image, the non-attenuated corrected nuclear image, and the x-ray image include varying views of a subject.

Illustrative Embodiment 6: The computer-implemented method of illustrative embodiment 5, wherein the final synthetic image includes a full view of the subject.

Illustrative Embodiment 7: The computer-implemented method of any of illustrative embodiments 1-6, wherein the at least third machine learning process comprises three machine learning processes, the method comprising:

applying a first of the three machine learning processes to the co-modality image and the segmentation mask and, based on the application of the first of the three machine learning processes, generating a first synthetic image of the plurality of synthetic images;

applying a second of the three machine learning processes to the non-attenuated corrected nuclear image and the segmentation mask and, based on the application of the second of the three machine learning processes, generating a second synthetic image of the plurality of synthetic images; and applying a third of the three machine learning processes to the x-ray image and the segmentation mask and, based on the application of the third of the three machine learning processes, generating a third synthetic image of the plurality of synthetic images.

Illustrative Embodiment 8: The computer-implemented method of illustrative embodiment 7, wherein applying the at least fourth machine learning process to the plurality of synthetic images comprises:

applying a feature extraction process to the first synthetic image and the third synthetic image and, based on the application of the feature extraction process, generating features;

modifying the features based on the second synthetic image; and generating the final synthetic image based on the modified features.

Illustrative Embodiment 9: The computer-implemented method of any of illustrative embodiments 1-8, wherein applying the at least fourth machine learning process to the plurality of synthetic images comprises:

applying an encoding process to the plurality of synthetic images and, based on the application of the encoding process, generating encoded features; and applying a first decoding process to the encoded features and, based on the application of the first decoding process, generating the final synthetic image.

Illustrative Embodiment 10: The computer-implemented method of illustrative embodiment 9, comprising applying a second decoding process to the encoded features and, based on the application of the second decoding process, generating a final segmentation mask.

Illustrative Embodiment 11: The computer-implemented method of any of illustrative embodiments 1-10, comprising applying a registration process to the final synthetic image and the non-attenuated corrected nuclear image to generate a final registered synthetic image.

Illustrative Embodiment 12: The computer-implemented method of any of illustrative embodiments 1-11, comprising displaying the final synthetic image.

Illustrative Embodiment 13: The computer-implemented method of any of illustrative embodiments 1-12, wherein the non-attenuated corrected nuclear image is a positron emission tomography (PET) image.

Illustrative Embodiment 14: The computer-implemented method of any of illustrative embodiments 1-12, wherein the non-attenuated corrected nuclear image is a single-photon emission computed tomography (SPECT) image.

Illustrative Embodiment 15: A non-transitory computer readable medium storing instructions that, when executed by at least one processor, cause the at least one processor to perform operations comprising:

receiving a co-modality image, a non-attenuated corrected nuclear image, and an x-ray image;

applying a first machine learning process to the co-modality image and, based on the application of the first machine learning process, generating location data identifying feature locations;

applying a second machine learning process to the non-attenuated corrected nuclear image, the x-ray image, and the location data and, based on the application of the second machine learning process, generating a segmentation mask;

applying at least a third machine learning process to the segmentation mask, the co-modality image, the non-attenuated corrected nuclear image, and the x-ray image, and based on the application of the at least third machine learning process, generating a plurality of synthetic images; and applying at least a fourth machine learning process to the plurality of synthetic images and, based on the application of the at least fourth machine learning process, generating a final synthetic image.

Illustrative Embodiment 16: The non-transitory computer readable medium of illustrative embodiment 15 storing instructions that, when executed by the at least one processor, further cause the at least one processor to perform operations comprising generating a final segmentation mask based on the final synthetic image.

Illustrative Embodiment 17: The non-transitory computer readable medium of any of illustrative embodiments 15-16 storing instructions that, when executed by the at least one processor, further cause the at least one processor to perform operations comprising generating an attenuation map based on the final synthetic image.

Illustrative Embodiment 18: The non-transitory computer readable medium of any of illustrative embodiments 15-17 storing instructions that, when executed by the at least one processor, further cause the at least one processor to perform operations comprising:

receiving an optical image;

applying the second machine learning process to the optical image; and applying the at least third machine learning process to the optical image.

Illustrative Embodiment 19: The non-transitory computer readable medium of any of illustrative embodiments 15-18, wherein each of the co-modality image, the non-attenuated corrected nuclear image, and the x-ray image include varying views of a subject.

Illustrative Embodiment 20: The non-transitory computer readable medium of illustrative embodiment 19, wherein the final synthetic image includes a full view of the subject.

Illustrative Embodiment 21: The non-transitory computer readable medium of any of illustrative embodiments 15-20 wherein the at least third machine learning process comprises three machine learning processes, the computer readable medium storing instructions that, when executed by the at least one processor, further cause the at least one processor to perform operations comprising:

applying a first of the three machine learning processes to the co-modality image and the segmentation mask and, based on the application of the first of the three machine learning processes, generating a first synthetic image of the plurality of synthetic images;

applying a second of the three machine learning processes to the non-attenuated corrected nuclear image and the segmentation mask and, based on the application of the second of the three machine learning processes, generating a second synthetic image of the plurality of synthetic images; and applying a third of the three machine learning processes to the x-ray image and the segmentation mask and, based on the application of the third of the three machine learning processes, generating a third synthetic image of the plurality of synthetic images.

Illustrative Embodiment 22: The non-transitory computer readable medium of illustrative embodiment 21 storing instructions that, when executed by the at least one processor, further cause the at least one processor to perform operations comprising:

applying a feature extraction process to the first synthetic image and the third synthetic image and, based on the application of the feature extraction process, generating features;

modifying the features based on the second synthetic image; and generating the final synthetic image based on the modified features.

Illustrative Embodiment 23: The non-transitory computer readable medium of any of illustrative embodiments 15-22 storing instructions that, when executed by the at least one processor, further cause the at least one processor to perform operations comprising:

applying an encoding process to the plurality of synthetic images and, based on the application of the encoding process, generating encoded features; and applying a first decoding process to the encoded features and, based on the application of the first decoding process, generating the final synthetic image.

Illustrative Embodiment 24: The non-transitory computer readable medium of illustrative embodiment 23 storing instructions that, when executed by the at least one processor, further cause the at least one processor to perform operations comprising applying a second decoding process to the encoded features and, based on the application of the second decoding process, generating a final segmentation mask.

Illustrative Embodiment 25: The non-transitory computer readable medium of any of illustrative embodiments 15-24 storing instructions that, when executed by the at least one processor, further cause the at least one processor to perform operations comprising applying a registration process to the final synthetic image and the non-attenuated corrected nuclear image to generate a final registered synthetic image.

Illustrative Embodiment 26: The non-transitory computer readable medium of any of illustrative embodiments 15-25 storing instructions that, when executed by the at least one processor, further cause the at least one processor to perform operations comprising displaying the final synthetic image.

Illustrative Embodiment 27: The non-transitory computer readable medium of any of illustrative embodiments 15-26, wherein the non-attenuated corrected nuclear image is a positron emission tomography (PET) image.

Illustrative Embodiment 28: The non-transitory computer readable medium of any of illustrative embodiments 15-26, wherein the non-attenuated corrected nuclear image is a single-photon emission computed tomography (SPECT) image.

Illustrative Embodiment 29: A system comprising:
a database; and
at least one processor communicatively coupled to the database and configured to:
  receive a co-modality image, a non-attenuated corrected nuclear image, and an x-ray image;
  apply a first machine learning process to the co-modality image and, based on the application of the first machine learning process, generate location data identifying feature locations;
  apply a second machine learning process to the non-attenuated corrected nuclear image, the x-ray image, and the location data and, based on the application of the second machine learning process, generate a segmentation mask;
  apply at least a third machine learning process to the segmentation mask, the co-modality image, the non-attenuated corrected nuclear image, and the x-ray image, and based on the application of the at least third machine learning process, generate a plurality of synthetic images; and
  apply at least a fourth machine learning process to the plurality of synthetic images and, based on the application of the at least fourth machine learning process, generate a final synthetic image.

Illustrative Embodiment 30: The system of illustrative embodiment 29, wherein the at least one processor is further configured to generate a final segmentation mask based on the final synthetic image.

Illustrative Embodiment 31: The system of any of illustrative embodiments 29-30, wherein the at least one processor is further configured to generate an attenuation map based on the final synthetic image.

Illustrative Embodiment 32: The system of any of illustrative embodiments 29-31, wherein the at least one processor is further configured to:
  receive an optical image;
  apply the second machine learning process to the optical image; and
  apply the at least third machine learning process to the optical image.

Illustrative Embodiment 33: The system of any of illustrative embodiments 29-32, wherein each of the co-modality image, the non-attenuated corrected nuclear image, and the x-ray image include varying views of a subject.

Illustrative Embodiment 34: The system of illustrative embodiment 33, wherein the final synthetic image includes a full view of the subject.

Illustrative Embodiment 35: The system of any of illustrative embodiments 29-33, wherein the at least third machine learning process comprises three machine learning processes, and wherein the at least one processor is further configured to:
  apply a first of the three machine learning processes to the co-modality image and the segmentation mask and, based on the application of the first of the three machine learning processes, generate a first synthetic image of the plurality of synthetic images;

apply a second of the three machine learning processes to the non-attenuated corrected nuclear image and the segmentation mask and, based on the application of the second of the three machine learning processes, generate a second synthetic image of the plurality of synthetic images; and
apply a third of the three machine learning processes to the x-ray image and the segmentation mask and, based on the application of the third of the three machine learning processes, generate a third synthetic image of the plurality of synthetic images.

Illustrative Embodiment 36: The system of illustrative embodiment 35, wherein to apply the at least fourth machine learning process to the plurality of synthetic image, the at least one processor is further configured to:
  apply a feature extraction process to the first synthetic image and the third synthetic image and, based on the application of the feature extraction process, generate features;
  modify the features based on the second synthetic image; and
  generate the final synthetic image based on the modified features.

Illustrative Embodiment 37: The system of any of illustrative embodiments 29-36, wherein to apply the at least fourth machine learning process to the plurality of synthetic images, the at least one processor is further configured to:
  apply an encoding process to the plurality of synthetic images and, based on the application of the encoding process, generating encoded features; and
  apply a first decoding process to the encoded features and, based on the application of the first decoding process, generate the final synthetic image.

Illustrative Embodiment 38: The system of illustrative embodiment 37, wherein the at least one processor is further configured to apply a second decoding process to the encoded features and, based on the application of the second decoding process, generate a final segmentation mask.

Illustrative Embodiment 39: The system of any of illustrative embodiments 29-38, wherein the at least one processor is further configured to apply a registration process to the final synthetic image and the non-attenuated corrected nuclear image to generate a final registered synthetic image.

Illustrative Embodiment 40: The system of any of illustrative embodiments 29-39, wherein the at least one processor is further configured to display the final synthetic image.

Illustrative Embodiment 41: The system of any of illustrative embodiments 29-40, wherein the non-attenuated corrected nuclear image is a positron emission tomography (PET) image.

Illustrative Embodiment 42: The system of any of illustrative embodiments 29-40, wherein the non-attenuated corrected nuclear image is a single-photon emission computed tomography (SPECT) image.

Illustrative Embodiment 43: A system comprising:
a means for receive a co-modality image, a non-attenuated corrected nuclear image, and an x-ray image;
a means for applying a first machine learning process to the co-modality image and, based on the application of the first machine learning process, generating location data identifying feature locations;
a means for applying a second machine learning process to the non-attenuated corrected nuclear image, the x-ray image, and the location data and, based on the application of the second machine learning process, generating a segmentation mask;

a means for applying at least a third machine learning process to the segmentation mask, the co-modality image, the non-attenuated corrected nuclear image, and the x-ray image, and based on the application of the at least third machine learning process, generating a plurality of synthetic images; and a means for applying at least a fourth machine learning process to the plurality of synthetic images and, based on the application of the at least fourth machine learning process, generating a final synthetic image.

Illustrative Embodiment 44: The system of illustrative embodiment 43, further comprising a means for generating a final segmentation mask based on the final synthetic image.

Illustrative Embodiment 45: The system of any of illustrative embodiments 43-44, further comprising a means for generating an attenuation map based on the final synthetic image.

Illustrative Embodiment 46: The system of any of illustrative embodiments 43-45, further comprising:

a means for receiving an optical image;

a means for applying the second machine learning process to the optical image; and a means for applying the at least third machine learning process to the optical image.

Illustrative Embodiment 47: The system of any of illustrative embodiments 43-46, wherein each of the co-modality image, the non-attenuated corrected nuclear image, and the x-ray image include varying views of a subject.

Illustrative Embodiment 48: The system of illustrative embodiment 47, wherein the final synthetic image includes a full view of the subject.

Illustrative Embodiment 49: The system of any of illustrative embodiments 43-48, wherein the at least third machine learning process comprises three machine learning processes, and the system further comprising:

a means for applying a first of the three machine learning processes to the co-modality image and the segmentation mask and, based on the application of the first of the three machine learning processes, generating a first synthetic image of the plurality of synthetic images;

a means for applying a second of the three machine learning processes to the non-attenuated corrected nuclear image and the segmentation mask and, based on the application of the second of the three machine learning processes, generating a second synthetic image of the plurality of synthetic images; and a means for applying a third of the three machine learning processes to the x-ray image and the segmentation mask and, based on the application of the third of the three machine learning processes, generating a third synthetic image of the plurality of synthetic images.

Illustrative Embodiment 50: The system of illustrative embodiment 49, wherein to apply the at least fourth machine learning process to the plurality of synthetic image, the system comprises:

a means for applying a feature extraction process to the first synthetic image and the third synthetic image and, based on the application of the feature extraction process, generating features;

a means for modifying the features based on the second synthetic image; and a means for generating the final synthetic image based on the modified features.

Illustrative Embodiment 51: The system of any of illustrative embodiments 43-50, wherein to apply the at least fourth machine learning process to the plurality of synthetic images, the system comprises:

a means for applying an encoding process to the plurality of synthetic images and, based on the application of the encoding process, generating encoded features; and a means for applying a first decoding process to the encoded features and, based on the application of the first decoding process, generating the final synthetic image.

Illustrative Embodiment 52: The system of illustrative embodiment 51, further comprising a means for applying a second decoding process to the encoded features and, based on the application of the second decoding process, generating a final segmentation mask.

Illustrative Embodiment 53: The system of any of illustrative embodiments 43-52, further comprising a means for applying a registration process to the final synthetic image and the non-attenuated corrected nuclear image to generate a final registered synthetic image.

Illustrative Embodiment 54: The system of any of illustrative embodiments 43-53, further comprising a means for displaying the final synthetic image.

Illustrative Embodiment 55: The system of any of illustrative embodiments 43-54, wherein the non-attenuated corrected nuclear image is a positron emission tomography (PET) image.

Illustrative Embodiment 56: The system of any of illustrative embodiments 43-54, wherein the non-attenuated corrected nuclear image is a single-photon emission computed tomography (SPECT) image.

The previous description of embodiments is provided to enable any person skilled in the art to practice the disclosure. The various modifications to these embodiments will be readily apparent to those skilled in the art, and the generic principles defined herein can be applied to other embodiments without the use of inventive faculty. The present disclosure is not intended to be limited to the embodiments shown herein, but is to be accorded the widest scope consistent with the principles and novel features disclosed herein.

What is claimed is:

1. A computer-implemented method comprising:

receiving a co-modality image, a non-attenuated corrected nuclear image, and an x-ray image;

applying a first machine learning process to the co-modality image and, based on the application of the first machine learning process, generating location data identifying feature locations;

applying a second machine learning process to the non-attenuated corrected nuclear image, the x-ray image, and the location data and, based on the application of the second machine learning process, generating a segmentation mask;

applying at least a third machine learning process to the segmentation mask, the co-modality image, the non-attenuated corrected nuclear image, and the x-ray image, and based on the application of the at least third machine learning process, generating a plurality of synthetic images; and applying at least a fourth machine learning process to the plurality of synthetic images and, based on the application of the at least fourth machine learning process, generating a final synthetic image.

2. The computer-implemented method of claim 1 further comprising generating a final segmentation mask based on the final synthetic image.

3. The computer-implemented method of claim 1 further comprising generating an attenuation map based on the final synthetic image.

4. The computer-implemented method of claim 1 comprising:

receiving an optical image;

applying the second machine learning process to the optical image; and applying the at least third machine learning process to the optical image.

5. The computer-implemented method of claim 1, wherein each of the co-modality image, the non-attenuated corrected nuclear image, and the x-ray image include varying views of a subject.

6. The computer-implemented method of claim 5, wherein the final synthetic image includes a full view of the subject.

7. The computer-implemented method of claim 1, wherein the at least third machine learning process comprises three machine learning processes, the method comprising:

applying a first of the three machine learning processes to the co-modality image and the segmentation mask and, based on the application of the first of the three machine learning processes, generating a first synthetic image of the plurality of synthetic images;

applying a second of the three machine learning processes to the non-attenuated corrected nuclear image and the segmentation mask and, based on the application of the second of the three machine learning processes, generating a second synthetic image of the plurality of synthetic images; and applying a third of the three machine learning processes to the x-ray image and the segmentation mask and, based on the application of the third of the three machine learning processes, generating a third synthetic image of the plurality of synthetic images.

8. The computer-implemented method of claim 7, wherein applying the at least fourth machine learning process to the plurality of synthetic images comprises:

applying a feature extraction process to the first synthetic image and the third synthetic image and, based on the application of the feature extraction process, generating features;

modifying the features based on the second synthetic image; and generating the final synthetic image based on the modified features.

9. The computer-implemented method of claim 1, wherein applying the at least fourth machine learning process to the plurality of synthetic images comprises:

applying an encoding process to the plurality of synthetic images and, based on the application of the encoding process, generating encoded features; and applying a first decoding process to the encoded features and, based on the application of the first decoding process, generating the final synthetic image.

10. The computer-implemented method of claim 9, comprising applying a second decoding process to the encoded features and, based on the application of the second decoding process, generating a final segmentation mask.

11. The computer-implemented method of claim 1, comprising applying a registration process to the final synthetic image and the non-attenuated corrected nuclear image to generate a final registered synthetic image.

12. The computer-implemented method of claim 1, comprising displaying the final synthetic image.

13. The computer-implemented method of claim 1, wherein the non-attenuated corrected nuclear image is a positron emission tomography (PET) image.

14. The computer-implemented method of claim 1, wherein the non-attenuated corrected nuclear image is a single-photon emission computed tomography (SPECT) image.

15. A non-transitory computer readable medium storing instructions that, when executed by at least one processor, cause the at least one processor to perform operations comprising:

receiving a co-modality image, a non-attenuated corrected nuclear image, and an x-ray image;

applying a first machine learning process to the co-modality image and, based on the application of the first machine learning process, generating location data identifying feature locations;

applying a second machine learning process to the non-attenuated corrected nuclear image, the x-ray image, and the location data and, based on the application of the second machine learning process, generating a segmentation mask;

applying at least a third machine learning process to the segmentation mask, the co-modality image, the non-attenuated corrected nuclear image, and the x-ray image, and based on the application of the at least third machine learning process, generating a plurality of synthetic images; and applying at least a fourth machine learning process to the plurality of synthetic images and, based on the application of the at least fourth machine learning process, generating a final synthetic image.

16. The non-transitory computer readable medium of claim 15 storing instructions that, when executed by the at least one processor, further cause the at least one processor to perform operations comprising generating a final segmentation mask based on the final synthetic image.

17. The non-transitory computer readable medium of claim 15 storing instructions that, when executed by the at least one processor, further cause the at least one processor to perform operations comprising generating an attenuation map based on the final synthetic image.

18. The non-transitory computer readable medium of claim 15 storing instructions that, when executed by the at least one processor, further cause the at least one processor to perform operations comprising:

receiving an optical image;

applying the second machine learning process to the optical image; and applying the at least third machine learning process to the optical image.

19. The non-transitory computer readable medium of claim 15 wherein the at least third machine learning process comprises three machine learning processes, the computer readable medium storing instructions that, when executed by the at least one processor, further cause the at least one processor to perform operations comprising:

applying a first of the three machine learning processes to the co-modality image and the segmentation mask and, based on the application of the first of the three machine learning processes, generating a first synthetic image of the plurality of synthetic images;

applying a second of the three machine learning processes to the non-attenuated corrected nuclear image and the segmentation mask and, based on the application of the second of the three machine learning processes, generating a second synthetic image of the plurality of synthetic images; and applying a third of the three machine learning processes to the x-ray image and the segmentation mask and, based on the application of the third of the three machine learning processes, generating a third synthetic image of the plurality of synthetic images.

20. A system comprising:

a database; and at least one processor communicatively coupled to the database and configured to:

receive a co-modality image, a non-attenuated corrected nuclear image, and an x-ray image;

apply a first machine learning process to the co-modality image and, based on the application of the first machine learning process, generate location data identifying feature locations;

apply a second machine learning process to the non-attenuated corrected nuclear image, the x-ray image, and the location data and, based on the application of the second machine learning process, generate a segmentation mask;

apply at least a third machine learning process to the segmentation mask, the co-modality image, the non-attenuated corrected nuclear image, and the x-ray image, and based on the application of the at least third machine learning process, generate a plurality of synthetic images; and apply at least a fourth machine learning process to the plurality of synthetic images and, based on the application of the at least fourth machine learning process, generate a final synthetic image.

* * * * *